(12) United States Patent
Tabayashi et al.

(10) Patent No.: US 12,186,711 B2
(45) Date of Patent: Jan. 7, 2025

(54) COMPOSITE SEMIPERMEABLE MEMBRANE

(71) Applicant: TORAY INDUSTRIES, INC., Tokyo (JP)

(72) Inventors: Shunsuke Tabayashi, Ehime (JP); Ryosuke Okanishi, Ehime (JP); Yuta Amano, Ehime (JP); Takashi Yoshino, Ehime (JP); Takao Sasaki, Ehime (JP); Hiroki Minehara, Shiga (JP); Masaki Higashi, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 18/287,800

(22) PCT Filed: Apr. 22, 2022

(86) PCT No.: PCT/JP2022/018640
§ 371 (c)(1),
(2) Date: Oct. 20, 2023

(87) PCT Pub. No.: WO2022/225063
PCT Pub. Date: Oct. 27, 2022

(65) Prior Publication Data
US 2024/0198294 A1  Jun. 20, 2024

(30) Foreign Application Priority Data

Apr. 22, 2021 (JP) .................. 2021-072383

(51) Int. Cl.
*B01D 69/12* (2006.01)
*B01D 69/02* (2006.01)
*B01D 69/10* (2006.01)

(52) U.S. Cl.
CPC ............ *B01D 69/12* (2013.01); *B01D 69/02* (2013.01); *B01D 69/10* (2013.01); *B01D 2325/04* (2013.01); *B01D 2325/06* (2013.01)

(58) Field of Classification Search
CPC .... B01D 69/02; B01D 69/12; B01D 2325/06; B01D 69/10; B01D 2325/04
See application file for complete search history.

(56) References Cited

U.S. PATENT DOCUMENTS 5,258,203 A  11/1993 Arthur
5,733,602 A   3/1998 Hirose et al.
(Continued)

FOREIGN PATENT DOCUMENTS

CN    1922244 A    2/2007
CN  102781560 A   11/2012
(Continued)

OTHER PUBLICATIONS

Chinese Office Action and Search Report for Chinese Application No. 202280030072.3, dated Jan. 20, 2024, with an English translation.

(Continued)

*Primary Examiner* — John Kim
(74) *Attorney, Agent, or Firm* — Birch, Stewart, Kolasch & Birch, LLP

(57) ABSTRACT

The present invention relates to a composite semipermeable membrane including: a support membrane; and a separation functional layer provided on the support membrane, in which the separation functional layer includes a thin membrane, the thin membrane has a fold structure including a plurality of protrusions, an actual length L of the thin membrane per 1 μm length of the support membrane in a cross-sectional direction perpendicular to a membrane sur- (Continued)

face is 3.0 μm or more, and a thickness of the thin membrane in the protrusion is 15 nm or more.

6 Claims, 5 Drawing Sheets

(56) References Cited

U.S. PATENT DOCUMENTS

| | | | |
|---|---|---|---|
| 10,350,553 | B2 | 7/2019 | Kamada et al. |
| 2007/0172682 | A1 | 7/2007 | Kobayashi et al. |
| 2007/0284309 | A1 | 12/2007 | Tomioka |
| 2012/0305473 | A1 | 12/2012 | Ogawa et al. |
| 2014/0034569 | A1 | 2/2014 | Yoo et al. |
| 2014/0339152 | A1* | 11/2014 | Okabe ............... B01D 69/1213 210/488 |
| 2015/0068963 | A1 | 3/2015 | Yoo et al. |
| 2015/0190759 | A1 | 7/2015 | Shimura et al. |
| 2015/0283515 | A1* | 10/2015 | Koiwa ............... B01D 69/1071 210/488 |
| 2017/0136422 | A1 | 5/2017 | Ogawa et al. |
| 2017/0368510 | A1* | 12/2017 | Tanaka ............... B01D 67/0093 |
| 2018/0318771 | A1 | 11/2018 | Koiwa et al. |
| 2019/0247800 | A1* | 8/2019 | Ogawa ............... B01D 69/12 |
| 2019/0282967 | A1 | 9/2019 | Zhang et al. |
| 2019/0388844 | A1 | 12/2019 | Minehara et al. |
| 2020/0061548 | A1 | 2/2020 | Miyabe et al. |

FOREIGN PATENT DOCUMENTS

| | | | |
|---|---|---|---|
| CN | 104411387 | A | 3/2015 |
| CN | 104607067 | A | 5/2015 |
| JP | 6-47260 | A | 2/1994 |
| JP | 8-224452 | A | 9/1996 |
| JP | 2008-517737 | A | 5/2008 |
| JP | 2014-65003 | A | 4/2014 |
| JP | 2014-521499 | A | 8/2014 |
| JP | 2016-144794 | A | 8/2016 |
| JP | 2018-69160 | A | 5/2018 |
| JP | 2019-177342 | A | 10/2019 |
| KR | 10-2012-0131165 | A | 12/2012 |
| KR | 10-2017-0027731 | A | 3/2017 |
| WO | WO 2010/120326 | A1 | 10/2010 |
| WO | WO 2018/143297 | A1 | 8/2018 |

OTHER PUBLICATIONS

Korean Office Action for Korean Application No. 10-2023-7035606, dated Jan. 9, 2024, with an English translation.
International Search Report, issued in PCT/JP2022/018640, PCT/ISA/210, dated Jul. 5, 2022.
Written Opinion of the International Searching Authority, issued in PCT/JP2022/018640, PCT/ISA/237, dated Jul. 5, 2022.
Extended European Search Report issued Sep. 3, 2024, in European Patent Application No. 22791834.9.
Qin et al., "Plasticizer-assisted interfacial polymerization for fabricating advanced reverse osmosis membranes," Journal of Membrane Science (2021), vol. 619, 118788, pp. 1-11.
Office Action issued Sep. 3, 2024, in Japanese Patent Application No. 2022-175061, with English translation.

\* cited by examiner

COMPOSITE SEMIPERMEABLE MEMBRANE

TECHNICAL FIELD

The present invention relates to a composite semipermeable membrane useful for selective separation of a liquid mixture. The composite semipermeable membrane obtained according to the present invention can be suitably used for desalination of, for example, seawater and brackish water.

BACKGROUND ART

There are various techniques for removing a substance (for example, salts) dissolved in a solvent (for example, water) in relation to separation of a mixture, and, in recent years, use of a membrane separation method as a process for energy and resource conservation has expanded. Membranes used in the membrane separation method include a microfiltration membrane, an ultrafiltration membrane, a nanofiltration membrane, a reverse osmosis membrane, and the like, and these membranes are used, for example, to obtain drinking water from seawater, brackish water, water containing a harmful substance, and the like, to produce ultrapure water for industrial use, to treat wastewater, or to recover a valuable material.

In particular, as a reverse osmosis membrane and a nanofiltration membrane, a composite semipermeable membrane containing a crosslinked polyamide as a separation active layer has been proposed. Methods for producing a composite semipermeable membrane containing a crosslinked polyamide as a separation active layer include a method of performing polymerization in the presence of an organic additive (Patent Literatures 1 and 2), a method of performing polymerization in the presence of a monofunctional acid halide (Patent Literature 3), and a method of performing polymerization in the presence of a partially hydrolyzed acid halide (Patent Literature 4).

CITATION LIST

Patent Literature

Patent Literature 1: JPH08-224452A
Patent Literature 2: JPH6-47260A
Patent Literature 3: JP2014-521499A
Patent Literature 4: WO2010/120326

SUMMARY OF INVENTION

Technical Problem

Despite the various proposals described above, it is difficult for a composite semipermeable membrane in related art to achieve both water production performance and desalination performance during high-pressure operation, and thus there is room for improvement.

An object of the present invention is to provide a composite semipermeable membrane exhibiting excellent water production performance and desalination performance even during high-pressure operation.

Solution to Problem

In order to achieve the above object, the present invention has the following configurations.

(1) A composite semipermeable membrane including:
  a support membrane; and
  a separation functional layer provided on the support membrane, in which
  the separation functional layer includes a thin membrane,
  the thin membrane has a fold structure including a plurality of protrusions,
  an actual length L of the thin membrane per 1 µm length of the support membrane in a cross-sectional direction perpendicular to a membrane surface is 3.0 µm or more, and
  a thickness of the thin membrane in the protrusion is 15 nm or more.

(2) The composite semipermeable membrane according to (0), in which
  the fold structure includes a protrusion having a height of 200 nm or more and a protrusion having a height of 10 nm or more and less than 200 nm, and
  a ratio (N/M) is 1/20 or more and 1/2 or less, provided that N is the number of the protrusions having the height of 200 nm or more and M is the number of the protrusions having the height of 10 nm or more.

(3) The composite semipermeable membrane according to (2), in which
  in the fold structure, a ratio of the number of the protrusions having a height of 400 nm or more to the number of the protrusions is 1/20 or more and 1/3 or less.

(4) The composite semipermeable membrane according to (2) or (3), in which
  among the protrusions, a ratio of protrusions having an angle θ satisfying 0<θ<75° is 5% or more, provided that the angle θ is an angle between a straight line (C) and an average line (A) of a roughness curve of the fold structure, the straight line (C) is a straight line passing through a point (a3) at an equal distance from two intersections (a1, a2) of the average line (A) and the thin membrane and a vertex of the protrusion.

(5) The composite semipermeable membrane according to any one of (2) to (4), in which
  at least a part of the plurality of the protrusions has a ratio (Wa/Wb) of larger than 1.3 in cross sections at arbitrary ten positions each having a length of 2.0 µm in a membrane surface direction of the support membrane, provided that Wa is a maximum width of the protrusion and Wb is a root width of the protrusion.

Advantageous Effects of Invention

According to the present invention, it is possible to obtain a composite semipermeable membrane that achieves both excellent water production performance and excellent desalination performance even during high-pressure operation.

DESCRIPTION OF EMBODIMENTS

Hereinafter, embodiments of the present invention will be described in detail, but the present invention is not limited in any way by these embodiments.

In the present description, "weight" and "mass", and "weight %" and "mass %" are treated as synonyms.

A numerical range expressed using "to" means a range including numerical values described before and after "to" as a lower limit value and an upper limit value.

1. Composite Semipermeable Membrane

A composite semipermeable membrane according to the present embodiment contains a support membrane and a separation functional layer provided on the support membrane.

(1-1) Support Membrane

In the present embodiment, the support membrane substantially has no separation performance for ions or the like but imparts strength to the separation functional layer substantially having separation performance. A size and a distribution of pores in the support membrane are not particularly limited, and for example, it is preferable that the support membrane has uniform fine pores or fine pores gradually increasing in size from a surface on which the separation functional layer is formed to the other surface, and a size of each fine pore is 0.1 nm or more and 100 nm or less on the surface on which the separation functional layer is formed.

Figure 1:
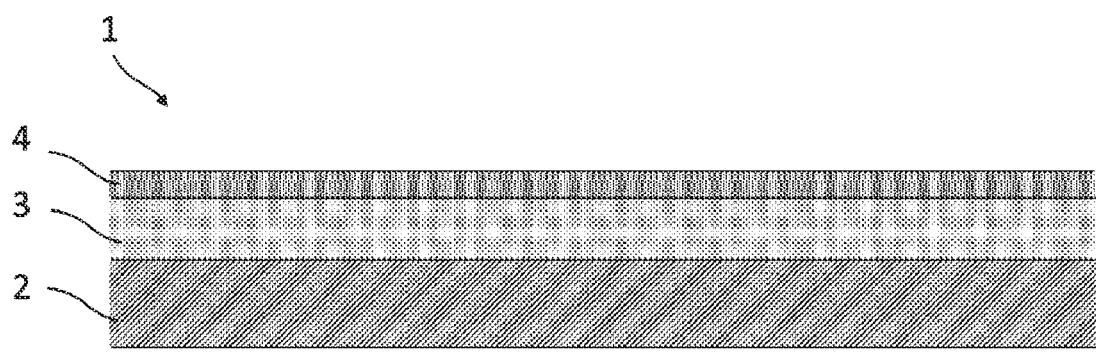
FIG. 1 is a cross-sectional view showing an embodiment of a composite semipermeable membrane.

A material used for the support membrane and a shape thereof are not particularly limited, and for example, as shown in FIG. 1, the support membrane may be a composite membrane containing a base material 2 and a porous support layer 3 provided on the base material 2 or may be a membrane containing only one layer.

Examples of the base material include a fabric containing, as a main component, at least one selected from polyesters and aromatic polyamides. As the fabric, a long-fiber nonwoven fabric or a short-fiber nonwoven fabric can be preferably used.

A thickness of the base material is preferably in a range of 10 μm or more and 200 μm or less and more preferably in a range of 30 μm or more and 120 μm or less.

The porous support layer may contain, for example, at least one polymer selected from the group consisting of polysulfones, polyethersulfones, polyamides, polyesters, cellulosic polymers such as cellulose acetate and cellulose nitrate, vinyl polymers such as polyethylene, polypropylene, polyvinyl chloride, and polyacrylonitrile, homopolymers such as polyphenylene sulfide, polyphenylene sulfide sulfone, polyphenylene sulfone, and polyphenylene oxide, and copolymers thereof.

Among these polymers, as the porous support layer, polysulfones, cellulose acetate, polyvinyl chloride, or a mixture thereof is preferably used, and a polysulfone having high chemical, mechanical, and thermal stability is particularly preferably used.

A thickness of the porous support layer is preferably in a range of 10 to 200 μm and more preferably in a range of 20 to 100 μm. When the thickness of the porous support layer is 10 μm or more, favorable pressure resistance can be obtained, and a uniform support membrane having no defect can be obtained. A composite semipermeable membrane containing such a porous support layer can exhibit favorable salt removal performance. When the thickness of the porous support layer is 200 μm or less, an amount of unreacted substances remaining during production does not increase, and a decrease in chemical resistance caused by a decrease in an amount of permeated water can be prevented.

In order for the composite semipermeable membrane to obtain sufficient mechanical strength and a sufficient packing density, a thickness of the support membrane is preferably in a range of 30 to 300 μm and more preferably in a range of 50 to 250 μm.

A form of the support membrane can be observed with a scanning electron microscope, a transmission electron microscope, an interatomic microscope, or the like. For example, in order to observe the form of the support membrane with a scanning electron microscope, the porous support layer is peeled off from the base material, and then the base material is cut by a freeze-fractionation method to obtain a sample for cross-sectional observation. The sample is thinly coated with, preferably, platinum, platinum-palladium, or ruthenium tetrachloride, more preferably ruthenium tetrachloride, and observed with an ultra-high-resolution field-emission scanning electron microscope (UHR-FE-SEM) at an acceleration voltage of 3 to 6 kV.

A thickness of each of the base material, the porous support layer, and the composite semipermeable membrane can be measured with a digital thickness gauge. In addition, since a thickness of the separation functional layer to be described later is much thinner than that of the support membrane, the thickness of the composite semipermeable membrane can be regarded as the thickness of the support membrane. Accordingly, the thickness of the porous support layer can be simply calculated by measuring the thickness of the composite semipermeable membrane with a digital thickness gauge and subtracting the thickness of the base material from the thickness of the composite semipermeable membrane. When using the digital thickness gauge, the thickness is measured at 20 locations and an average value thereof is calculated.

The thickness of each of the base material, the porous support layer, and the composite semipermeable membrane may also be measured with the above-described microscope. The thickness is determined by measuring a thickness of one sample at five arbitrary locations from electron microscopic images for cross-sectional observation and calculating an average value. A thickness and a pore diameter in the present embodiment each means an average value.

(1-2) Separation Functional Layer

Figure 2:
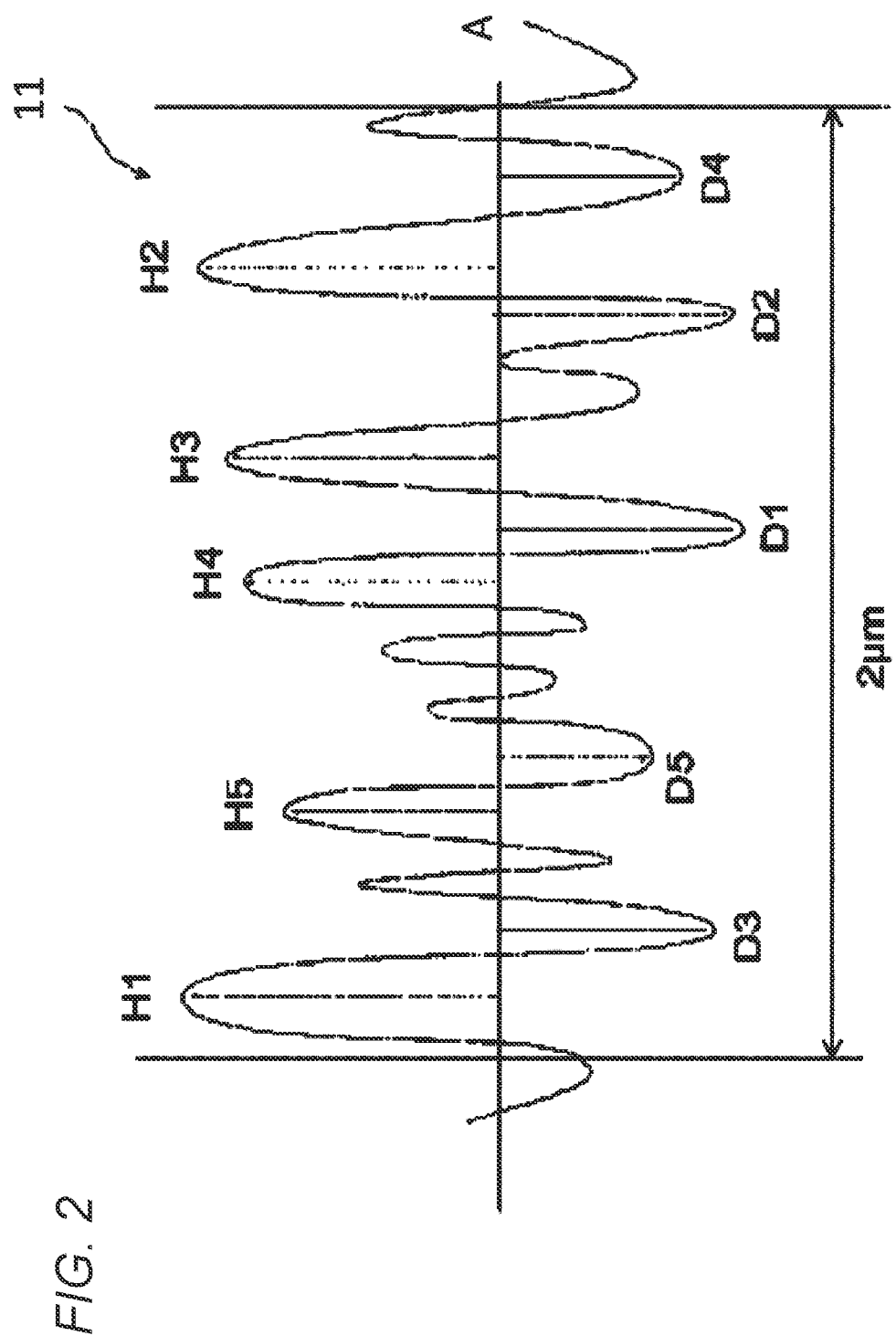
FIG. 2 is a cross-sectional view showing a fold structure of a thin membrane in a separation functional layer.

In the composite semipermeable membrane, the separation functional layer substantially has separation performance for ions or the like. In a cross-sectional view of a composite semipermeable membrane shown in FIG. 1, the separation functional layer is denoted by reference numeral "4". The separation functional layer contains a thin membrane 11 as shown in FIG. 2, and the thin membrane 11 forms a fold structure containing a plurality of protrusions.

The separation functional layer preferably contains a polyamide as a main component. In the case of a separation functional layer containing a polyamide as a main component, the polyamide forming the separation functional layer can be formed by, for example, interfacial polycondensation between a polyfunctional amine and a polyfunctional acid halide. Here, it is preferable that at least one of the polyfunctional amine and the polyfunctional acid halide contains a trifunctional or higher functional compound.

In order to obtain sufficient separation performance and a sufficient amount of permeated water, the thickness of the separation functional layer is usually in a range of 0.01 to 1 µm and preferably in a range of 0.1 to 0.5 µm.

Here, the polyfunctional amine refers to an amine having at least two primary amino groups and/or secondary amino groups in one molecule in which at least one of the amino groups being a primary amino group. Examples of the polyfunctional amine include: aromatic polyfunctional amines such as phenylenediamine in which two amino groups are bonded to a benzene ring in an ortho-positional, a meta-positional, or a para-positional relationship, xylylenediamine, 1,3,5-triaminobenzene, 1,2,4-triaminobenzene, 3,5-diaminobenzoic acid, 3-aminobenzylamine, and 4-aminobenzylamine; aliphatic amines such as ethylenediamine and propylenediamine; and alicyclic polyfunctional amines such as 1,2-diaminocyclohexane, 1,4-diaminocyclohexane, 4-aminopiperidine, and 4-aminoethylpiperazine.

Among these polyfunctional amines, in consideration of selective separation performance, permeability, and heat resistance of the membrane, an aromatic polyfunctional amine having 2 to 4 primary amino groups and/or secondary amino groups in one molecule is preferable. As such a polyfunctional aromatic amine, for example, m-phenylenediamine, p-phenylenediamine, and 1,3,5-triaminobenzene are preferably used. Among these polyfunctional aromatic amines, m-phenylenediamine (hereinafter referred to as m-PDA) is more preferably used in view of availability and ease of handling.

These polyfunctional amines may be used alone or two or more amines may be used in combination. When two or more amines are used at the same time, the amines described above may be used in combination, or an amine described above may be used in combination with an amine having at least two secondary amino groups in one molecule. Examples of the amine having at least two secondary amino groups in one molecule include piperazine and 1,3-bispiperidylpropane.

The polyfunctional acid halide refers to an acid halide having at least two halogenated carbonyl groups in one molecule. Examples of a trifunctional acid halide include: trimesic acid chloride; 1,3,5-cyclohexanetricarboxylic acid trichloride; and 1,2,4-cyclobutanetricarboxylic acid trichloride. Examples of a bifunctional acid halide include: aromatic bifunctional acid halides such as biphenyl dicarboxylic acid dichloride; azobenzene dicarboxylic acid dichloride, terephthalic acid chloride, isophthalic acid chloride, and naphthalene dicarboxylic acid chloride; aliphatic bifunctional acid halides such as adipoyl chloride and sebacoyl chloride; and alicyclic bifunctional acid halides such as cyclopentanedicarboxylic acid dichloride, cyclohexanedicarboxylic acid dichloride, and tetrahydrofurandicarboxylic acid dichloride.

In consideration of reactivity with the polyfunctional amine, the polyfunctional acid halide is preferably a polyfunctional acid chloride. In addition, in consideration of selective separation performance and heat resistance of the membrane, it is more preferable to use a polyfunctional aromatic acid chloride having 2 to 4 carbonyl chloride groups in one molecule. Among them, trimesic acid chloride is more preferably used as the polyfunctional acid halide from the viewpoint of availability and ease of handling. These polyfunctional acid halides may be used alone or two or more thereof may be used in combination.

In the separation functional layer, as shown in FIG. 2, the thin membrane forms a fold structure including a plurality of concave portions and convex portions. Hereinafter, the term "convex portion" and the term "concave portion" refer to a relatively protruding portion and a relatively recessed portion of the thin membrane, and in particular, a portion above (in a direction away from the support membrane) a reference line A to be described later is referred to as a convex portion, and a portion below (on a side close to the support membrane) is referred to as a concave portion. The term "protrusion" refers to a portion from a bottom of a concave portion to a bottom of an adjacent concave portion, that is, a portion from one convex portion to bottoms of two concave portions adjacent thereto. In addition, in the present description, a protrusion refers to a protrusion whose height is one-fifth or more of a ten-point average surface roughness of the thin membrane.

In the separation functional layer in the present embodiment, an actual length L of the thin membrane per 1 µm length of the support membrane in a cross-sectional direction perpendicular to a membrane surface is 3.0 µm or more. When the actual length L of the thin membrane is 3.0 µm or more, the composite semipermeable membrane can obtain high water permeability. The actual length L of the thin membrane is preferably 3.1 µm or more, more preferably 3.3 µm or more, and still more preferably 3.5 µm or more. In addition, the actual length L of the thin membrane is preferably 100 µm or less and more preferably 10 µm or less.

In this description, the term "cross-sectional direction perpendicular to the membrane surface" means a direction straight along a direction perpendicular to the membrane surface.

The actual length L of the thin membrane can be obtained according to a general method for obtaining a surface area or a specific surface area, and the method is not particularly limited. For example, a method using an electron microscope such as a scanning electron microscope (SEM, FE-SEM) or a transmission electron microscope (TEM) can be adopted.

An example of the method of measuring the actual length L of the thin membrane using a transmission electron microscope (TEM) will be described. First, in order to prepare an ultrathin section for the TEM, a sample is embedded in a water-soluble polymer. Any water-soluble polymer may be used as long as the polymer can maintain a shape of the sample, and an example thereof is PVA. Next, in order to facilitate cross-section observation, the sample is stained with $OsO_4$, and the stained sample is cut with an ultramicrotome to prepare an ultrathin section. A cross-sectional image of the obtained ultrathin section is captured using an electron microscope. An observation magnification may be appropriately determined based on the membrane thickness of the separation functional layer, and, in order to observe a cross-sectional shape of the separation functional layer and prevent the measurement from being localized, the observation magnification may be set to 50,000 to 100,000 times if the thickness of the separation functional layer is 10 to 100 nm.

Actual lengths of the thin membrane per 1 µm length of the support membrane in the cross-sectional direction perpendicular to the membrane surface are measured in arbitrary 10 cross sections each having a length of 2.0 µm in the cross-sectional image obtained above, and an additive average value thereof is calculated as the actual length L of the thin membrane of the composite semipermeable membrane.

The ten-point average surface roughness of the thin membrane is obtained by the following method.

A cross section in a direction perpendicular to the membrane surface is observed using an electron microscope. An observation magnification is preferably 10,000 to 100,000 times. In an obtained cross-sectional image, as shown in FIG. 2, a surface of the thin membrane (denoted by reference numeral "11" in FIG. 2) appears as a curve. For this curve, a roughness curve defined based on ISO 4287:1997 is obtained. Similarly, an average line of the roughness curve is obtained based on ISO 4287:1997. The average line is a straight line drawn such that total areas of regions surrounded by the average line and the roughness curve above and below the average line are equal.

As shown in FIG. 2, in a cross-sectional image having a length of 2.0 μm in a direction of the average line obtained above, the average line is set as the reference line A, and heights (distances from the reference line to vertices of convex portions) H1 to H5 from the reference line are measured for five convex portions from the highest convex portion to the fifth highest convex portion, and an average value thereof is calculated. In addition, depths (distances from the reference line to vertices of concave portions) DI to D5 are measured for five concave portions from the deepest concave portion to the fifth deepest concave portion, and an average value thereof is calculated. A sum of the obtained two average values is the ten-point average surface roughness. A vertex refers to a point at which a distance from the reference line is maximum on the convex portion or the concave portion.

The height of the protrusion is calculated as follows. In a cross section having a length of 2.0 μm in the direction of the average line, for a protrusion that is one-fifth or more of the ten-point average surface roughness, a sum of an average d of depths (distances from the reference line to vertices of concave portions) d1 and d2 of two concave portions adjacent to the protrusion and a convex portion height h (a distance from the reference line to a vertex of a convex portion) is calculated as a protrusion height Ph.

The fold structure in the present embodiment preferably contains a protrusion having a height of 200 nm or more and a protrusion having a height of 10 nm or more and less than 200 nm.

In addition, in arbitrary ten cross sections each having a length of 2.0 μm in the direction of the average line, it is preferable that a ratio (N/M) of the number N of protrusions having a height of 200 nm or more in the ten cross sections to the number M of protrusions having a height of 10 nm or more in the ten cross sections is 1/20 or more and 1/2 or less. When N/M is 1/20 or more, a composite semipermeable membrane having high water permeability is obtained. The ratio is more preferably 1/10 or more. When N/M is 1/2 or less, high water permeability can be obtained while a high removal rate is maintained. N/M is more preferably 1/3 or less.

The number of protrusions in the ten cross sections means a sum obtained by obtaining the number of protrusions in each cross section for all the ten cross sections and summing up the numbers of protrusions obtained for each cross section over the ten cross sections.

In arbitrary ten cross sections each having a length of 2.0 μm in the direction of the average line, it is preferable that at least one protrusion having a height of 400 nm or more is present in all the protrusions in the ten cross sections. In addition, it is more preferable that a ratio (N1/M) of the number N1 of protrusions having a height of 400 nm or more in the ten cross sections to the number M of the protrusions having a height of 10 nm or more in the ten cross sections is 1/20 or more and 1/5 or less. When the separation functional layer contains the protrusions having a height of 400 nm in the above range, deformation of low protrusions is inhibited even when the composite semipermeable membrane is used under high-pressure operation, and thus high water permeability and salt removal performance can be maintained.

Figure 3:
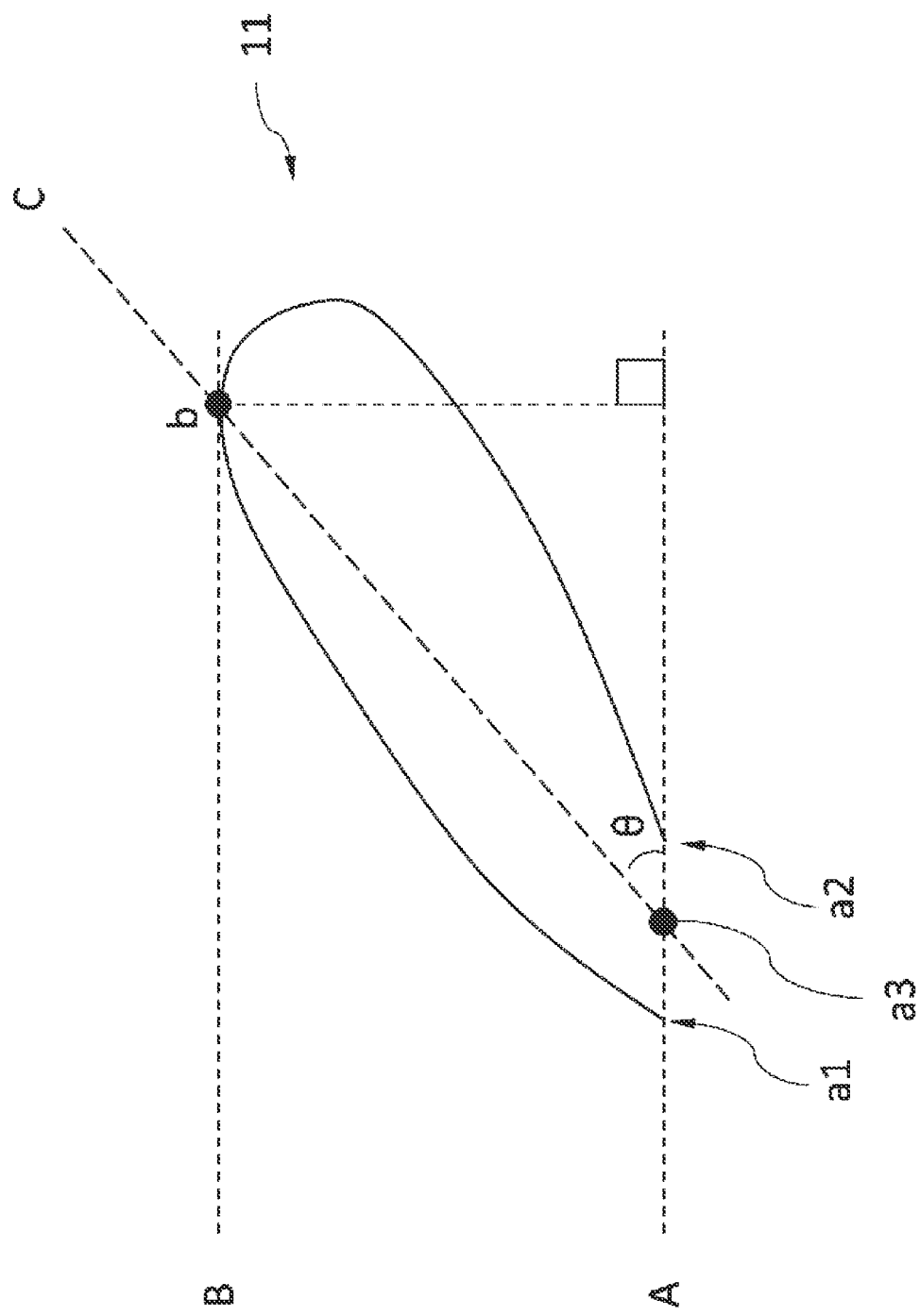
FIG. 3 is a schematic view showing a protrusion angle in the fold structure.

As shown in FIG. 3, one protrusion has two intersections a1 and a2 between the average line A of the roughness curve of the fold structure and the thin membrane. When a straight line passing through a point a3 at equal distances from the intersections a1 and a2 on the average line A and a vertex b of the protrusion is defined as a straight line C, an angle that is 90° or less formed by the straight line C and the average line A is referred to as a protrusion angle. The protrusion angle is indicated by θ in FIG. 3.

A ratio of the number of protrusions having the protrusion angle θ satisfying 0<θ<75° in the arbitrary ten cross sections each having a length of 2.0 μm in the direction of the average line to the number of all protrusions in the ten cross sections is preferably 5% or more and more preferably 20% or more. In addition, the ratio is preferably 80% or less. When 5% of the protrusions have the protrusion angle within the above range, the protrusions overlap each other in an up-down vertical direction, so that deformation of the protrusions can be inhibited even when the composite semipermeable membrane is used under high pressure, and as a result, high water permeability and a high salt removal rate can be maintained.

The thickness of the thin membrane on the protrusion can be measured by a TEM. Preparation of an ultrathin section for the TEM is as described in the description of the measurement of the actual length L. A cross section of the obtained ultrathin section is imaged by the TEM. An observation magnification may be appropriately determined depending on the thickness of the separation functional layer. The obtained cross-sectional image can be analyzed with image analysis software.

Figure 4:
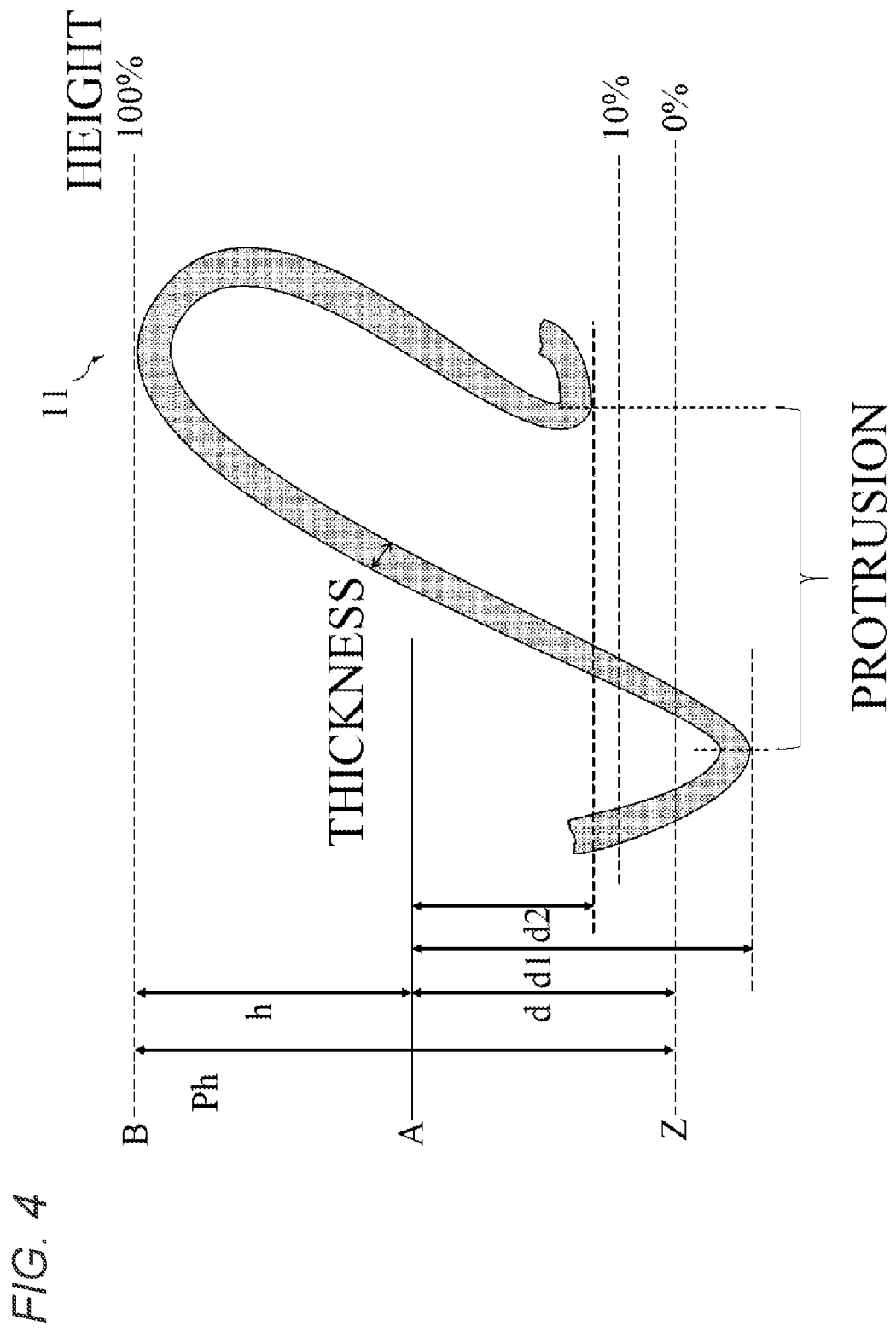
FIG. 4 is a cross-sectional view of the fold structure and is a schematic view showing a height of a protrusion and a thickness of the thin membrane.

Five protrusions are selected from the cross-sectional image obtained above. As shown in FIG. 4, for one protrusion, the average value d of the depths d1 and d2 from the reference line A to vertices of two concave portions adjacent to a convex portion is calculated, and a position at the distance d from the reference line A below the reference line A (on a side close to the support membrane) is defined as 0% height, and the vertex of the protrusion is defined as 100% height. A thickness of the thin membrane 11 on the protrusion is measured at 10 points within a height range of 10% to 100%. The same measurement is performed on five protrusions. For values of 50 points of the thickness of the thin membrane at 10% to 100% height obtained in this manner, an additive average value is calculated. This value is defined as the thickness of the thin membrane on the protrusion of the composite semipermeable membrane.

In the present embodiment, the thickness of the thin membrane on the protrusion obtained above is 15 nm or more. When the thickness of the thin membrane is 15 nm or more, the composite semipermeable membrane can maintain sufficient water permeability and a sufficient salt removal rate even under high-pressure operation. The thickness of the thin membrane on the protrusion is preferably 16 nm or more and more preferably 17 nm or more. In addition, in order to obtain excellent water permeability, the thickness of the thin membrane on the protrusion is preferably 30 nm or less.

Figure 5:
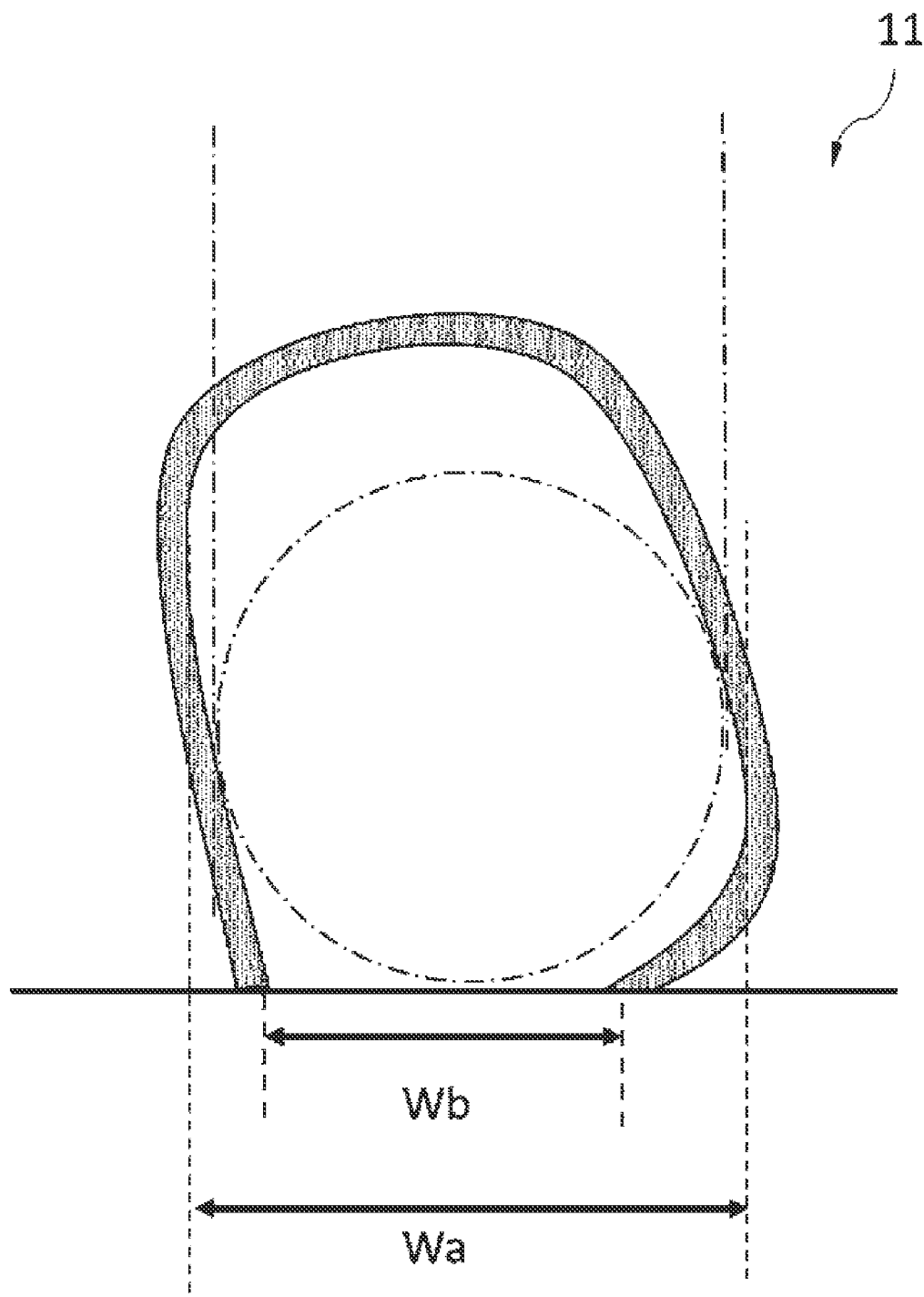
FIG. 5 is an enlarged cross-sectional view of the protrusion in the fold structure.

In the separation functional layer according to the present embodiment, it is preferable that at least a part of the plurality of protrusions in the separation functional layer have a ratio (Wa/Wb) of larger than 1.3 in arbitrary ten cross sections each having a length of 2.0 μm in a membrane surface direction of the support membrane as shown in FIG. 5, in which Wa is a maximum width of the protrusion and Wb is a root width of the protrusion. By providing the protrusion having Wa/Wb larger than 1.3, higher water permeability is obtained even under high-pressure operation. It is more preferable that Wa/Wb is larger than 1.3 and is 1.8 or less.

In this description, the term "membrane surface direction" means a direction orthogonal to a direction perpendicular to a membrane surface.

The maximum width Wa of the protrusion and the root width Wb of the protrusion can be observed with a scanning electron microscope or a transmission electron microscope. For example, when the maximum width Wa of the protrusion and the root width Wb of the protrusion are observed with a scanning electron microscope, it is preferable that platinum, platinum-palladium, or ruthenium tetroxide, more preferably ruthenium tetroxide is thinly coated on a sample of the composite semipermeable membrane, and the sample is observed using an ultra-high-resolution field-emission scanning electron microscope (UHR-FE-SEM) at an acceleration voltage of 3 to 6 kV. As the ultra-high-resolution field-emission scanning electron microscope, an S-900 type electron microscope manufactured by Hitachi, Ltd. or the like can be used. An observation magnification is preferably 5,000 to 100,000 times.

The maximum width Wa of the protrusion and the root width Wb of the protrusion can be directly measured by a scale or the like from an obtained electron microscopic image in consideration of the observation magnification. The maximum width Wa of the protrusion and the root width of the protrusion are both measured as an interval between inner surfaces of the protrusion. In addition, the root width Wb of the protrusion is obtained by measuring an interval between straight lines drawn to be orthogonal to the reference line from vertices of two concave portions adjacent to the protrusion.

In the ten cross sections each having a length of 2.0 μm in the membrane surface direction of the support membrane, a ratio of the number of protrusions having Wa/Wb larger than 1.3 in the ten cross sections to the number of all protrusions in the ten cross sections is preferably 20% or more and more preferably 40% or more.

2. Production Method

An example of a method for producing the composite semipermeable membrane according to the present embodiment described above is shown below.

(2-1) Formation of Separation Functional Layer

A process of forming the separation functional layer on the support membrane will be described. Hereinafter, a case where the support membrane contains the base material and the porous support layer will be described as an example. When the support membrane does not contain the base material, "surface of the porous support layer" and "on the porous support layer" may be read as "surface of the support membrane" and "on the support membrane", respectively.

The process of forming the separation functional layer includes a step of bringing a polyfunctional amine solution into contact with a polyfunctional acid halide solution on the porous support layer to form a polyamide by an interfacial polycondensation reaction.

More specifically, the process of forming the separation functional layer includes:
(i) bringing the porous support layer into contact with the polyfunctional amine solution; and
(ii) bringing an organic solvent solution containing the polyfunctional acid halide into contact with the porous support layer after (i) to produce the polyamide on the porous support layer by interfacial polycondensation.

Hereinafter, each production process will be described in detail.

The polyfunctional amine solution is an aqueous solution, a concentration of a polyfunctional amine in the solution is preferably in a range of 0.1 to 20 weight % and more preferably in a range of 0.5 to 15 weight %. When the concentration of the polyfunctional amine is in the above range, a composite semipermeable membrane having sufficient salt removal performance and water permeability can be obtained.

The polyfunctional amine aqueous solution may contain a surfactant, an organic solvent, an alkaline compound, an antioxidant, and the like as long as the reaction between the polyfunctional amine and the polyfunctional acid halide is not hindered.

Examples of the surfactant include compounds having a polyoxyalkylene structure, a fatty acid ester structure, or a hydroxy group, and examples of the polyoxyalkylene structure include $-(CH_2CH_2O)_n-$, $-(CH_2CH_2(CH_3)O)_n-$, $-(CH_2CH_2CH_2O)_n-$, and $-(CH_2CH_2CH_2CH_2O)_n-$. Examples of the fatty acid ester structure include fatty acids having a long-chain aliphatic group. The long-chain aliphatic group may be linear or branched, and examples of the fatty acid include stearic acid, oleic acid, lauric acid, palmitic acid, and salts thereof. In addition, examples of a fatty acid ester derived from oils and fats include beef tallow, palm oil, and coconut oil. Examples of a surfactant having a sulfo group include 1-hexane sulfonic acid, I-octane sulfonic acid, I-decane sulfonic acid, 1-dodecane sulfonic acid, perfluorobutane sulfonic acid, toluene sulfonic acid, cumene sulfonic acid, and octylbenzene sulfonic acid. Examples of the surfactant having a hydroxy group include ethylene glycol, propylene glycol, 2-propanediol, 1,4-butanediol, glycerin, sorbitol, glucose, and sucrose. The surfactant has an effect of improving wettability of the surface of the porous support layer and reducing interfacial tension between an amine aqueous solution and a nonpolar solvent.

Examples of the organic solvent include a chain amide compound and a cyclic amide compound. Examples of the chain amide compound include N-methylformamide, N,N-dimethylformamide, N,N,-dimethylacetamide, N,N-diethylformamide, and N,N-diethylacetamide. Examples of the cyclic amide compound include N-methylpyrrolidinone. γ-butyrolactam, and ε-caprolactam. The organic solvent may act as a catalyst for the interfacial polycondensation reaction, and the interfacial polycondensation reaction may efficiently be performed due to addition of the organic solvent.

Examples of the alkaline compound include: alkali metal hydroxides such as sodium hydroxide and potassium hydroxide; inorganic carbonate compounds and inorganic hydrogen carbonate compounds such as sodium carbonate, sodium hydrogen carbonate, potassium carbonate, and potassium hydrogen carbonate; and organic compounds such as tetramethylammonium hydroxide and tetraethylammonium hydroxide.

Examples of the antioxidant include a phenol-based antioxidant, an amine-based antioxidant, a sulfur-based antioxidant, and a phosphorus-based antioxidant. Examples of the phenol-based antioxidant (including a hindered phenol-based antioxidant) include 2,6-di-tert-butyl-4-methylphenol, 2,2'-methylene bis(4-ethyl-6-tert-butylphenol), and tetrakis-[methylene-3-(3',5'-di-tert-butyl-4'-hydroxyphenyl)propionate]methane. Examples of the amine-based antioxidant include phenyl-β-naphthylamine, α-naphthylamine, N,N'-di-sec-butyl-p-phenylenediamine, phenothiazine, and N,N'-diphenyl-p-phenylenediamine. Examples of the sulfur-based antioxidant include dilauryl 3,3'-thiodipropionate, distearyl thiodipropionate, lauryl stearyl thiodipropionate, and dimyristyl 3,3'-thiodipropionate.

Examples of the phosphorus-based antioxidant include triphenyl phosphite, octadecyl phosphite, and trinonylphenyl phosphite. Examples of other antioxidants include: ascorbic acid or an alkali metal salt thereof; steric hindrance phenol compounds such as dibutylhydroxytoluene and butylhydroxyanisole; isopropyl citrate; dl-α-tocopherol; nordihydroguaiaretic acid; and propyl gallate.

Contact between the polyfunctional amine aqueous solution and the porous support layer is preferably performed uniformly and continuously on the surface of the porous support layer. Specific examples of a method for bringing the polyfunctional amine aqueous solution into contact with the porous support layer include a method of applying the polyfunctional amine aqueous solution to the porous support layer and a method of immersing the porous support layer in the polyfunctional amine aqueous solution. A time of contact between the porous support layer and the polyfunctional amine aqueous solution is preferably in a range of 1 to 10 minutes and more preferably in a range of 1 to 3 minutes.

After the polyfunctional amine aqueous solution is brought into contact with the porous support layer, it is preferable to sufficiently remove liquid such that no droplet remains on the membrane. By sufficiently removing liquid, it is possible to prevent droplet residue from becoming a membrane defect after membrane formation and deteriorating membrane performance. As a liquid removal method, for example, as disclosed in JPH2-78428A, a method of holding the support membrane in a vertical direction after the contact with the polyfunctional amine aqueous solution and allowing the excessive aqueous solution to naturally flow down, a method of forcibly removing liquid by blowing an air flow such as nitrogen from an air nozzle, or the like can be used. In addition, after the liquid removal, the membrane surface can be dried to partially remove water of the aqueous solution.

Step (ii) will be described. Step (ii) is a step of bringing an organic solvent solution containing a polyfunctional acid halide into contact with the porous support layer after (i) described above to produce a polyamide on the porous support layer by interfacial polycondensation.

A concentration of the polyfunctional acid halide in the organic solvent solution is preferably in a range of 0.01 to 10 weight % and more preferably in a range of 0.02 to 2.0 weight %. When the concentration is 0.01 weight % or more, a sufficient reaction rate can be obtained. In addition, when the concentration is 10 weight % or less, occurrence of a side reaction can be inhibited.

It is preferable that the organic solvent is immiscible with water, dissolves the polyfunctional acid halide, and does not damage the support membrane. The organic solvent is inert to polyfunctional amine compounds and polyfunctional acid halides. Preferred examples of the organic solvent include hydrocarbon compounds such as η-hexane, η-octane, and η-decane.

The polyfunctional acid halide solution contains a compound represented by chemical formula (I) shown below (hereinafter referred to as a compound (I)).

[Chem. 1]

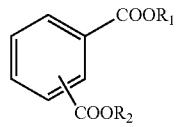

Compound (I)

In the above formula. $R_1$ and $R_2$ each independently represent an alkyl group having 1 or more carbon atoms.

The compound (I) is preferably an aromatic ester and particularly preferably a phthalate ester. Specific examples of the compound (I) include dibutyl phthalate, dibutyl benzyl phthalate, diethyl hexyl phthalate, diisodecyl phthalate, diisononyl phthalate, dioctyl phthalate, diisobutyl phthalate, diethyl phthalate, dimethyl phthalate, diisooctyl phthalate, dipropyl phthalate, dicyclohexyl phthalate, dinonyl phthalate, dibenzyl phthalate, dihexyl phthalate, dibenzyl phthalate, diphenyl phthalate, and bis(2-ethylhexyl) phthalate.

As a result of intensive studies by the present inventors, it has been found that by forming the separation functional layer by interfacial polycondensation between the polyfunctional amine and the polyfunctional acid halide solution in the presence of the compound (I), it is possible to increase the actual length of a thin membrane of the separation functional layer and increase the thickness of the thin membrane, and it is possible to achieve both water permeability and salt removal performance of the composite semipermeable membrane.

Although an action mechanism of the compound (1) is not clear, it is considered that an interaction between an aromatic ring in the compound (I) and an aromatic ring in the polyamide in the process of formation has an influence. Specifically, when the amine diffuses from the polyfunctional amine aqueous solution to the organic solvent containing the polyfunctional acid halide during the interfacial polycondensation between the polyfunctional amine and the polyfunctional acid halide, a concentration gradient of the amine is gentle due to the presence of the compound (I), and as a result, a formation time of the protrusion in the separation functional layer is sufficiently long, a structure formation of the protrusion easily proceeds, and a surface area of the protrusion and the thickness of the thin membrane are both increased.

Further, when the separation functional layer is formed, the polyfunctional acid halide solution to which the compound (1) is added preferably further contains water. It is considered that the concentration gradient varies from the polyfunctional amine aqueous solution to the polyfunctional acid halide solution in the membrane surface direction due to the presence of water in the polyfunctional acid halide solution, and thus the height of the protrusion and the protrusion angle are also changed.

A concentration of the compound (I) in the polyfunctional acid halide solution can be changed depending on a type of the compound (I) to be added, the concentration is preferably 5 ppm or more, and more preferably 10 ppm or more from the viewpoint of achieving both water permeability and removal performance. In addition, from the viewpoint of removal performance, the concentration of the compound (I) is preferably 500 ppm or less and more preferably 100 ppm or less.

In addition, it is also preferable to add water of 110 ppm or more to the polyfunctional acid halide solution. When the polyfunctional acid halide solution contains water of 110 ppm or more, water permeability can be further improved while maintaining high removal performance. Water added to the polyfunctional acid halide solution is more preferably 120 ppm or more. In addition, from the viewpoint of removal performance, water added to the polyfunctional acid halide solution is preferably 300 ppm or less and more preferably 200 ppm or less.

The polyfunctional acid halide solution may further contain, as an additive, a monofunctional acid halide, trimesic acid chloride in which one acid chloride group is hydrolyzed (hereinafter referred to as monohydrolyzed TMC), or trimesic acid chloride in which two acid chloride groups are hydrolyzed (hereinafter referred to as dihydrolyzed TMC.

Examples of the monofunctional acid halide include at least one compound selected from the group consisting of benzoyl fluoride, benzoyl chloride, benzoyl bromide, methanoyl fluoride, methanoyl chloride, methanoyl bromide, ethanoyl fluoride, ethanoyl chloride, ethanoyl bromide, propanoyl fluoride, propanoyl chloride, propanoyl bromide, propenoyl fluoride, propenoyl chloride, propenoyl bromide, butanoyl fluoride, butanoyl chloride, butanoyl bromide, butenoyl fluoride, butenoyl chloride, and butenoyl bromide.

Examples of a method for bringing the organic solvent solution containing the polyfunctional acid halide into contact with the polyfunctional amine compound solution include application and dripping.

In step (ii), a layer of the polyfunctional acid halide solution containing the compound (I) is further formed on a layer of the polyfunctional amine aqueous solution on the porous support layer obtained in step (i). Here, in the layer of the polyfunctional acid halide solution, it is preferable that a gradient is formed in which a water content increases as the porous support layer is closer.

The gradient is preferably formed immediately (within about 5 seconds) after the layer of the polyfunctional amine aqueous solution and the layer of the polyfunctional acid halide solution are brought into contact with each other. When the gradient is formed, a difference in surface tension occurs inside the layer of the polyfunctional acid halide solution, and a flow occurs in the layer of the polyfunctional acid halide solution. Due to this flow, in the fold structure of the separation functional layer, a protrusion having a shape in which a root of the protrusion is thin whereas a body bulges is formed, and the water permeability can be improved.

At this time, since the compound (I) is present in the poly functional acid halide solution, the flow is formed in the layer of the polyfunctional acid halide solution, that is, an organic solvent layer, while sufficient time is provided for formation of the protrusion in the separation functional layer, thus structure formation of the protrusion easily proceeds, and a protrusion surface area and a thickness are both increased.

The gradient can be formed, for example, by applying polyfunctional acid halide solutions having different water contents onto the porous support layer a plurality of times. The number of times of application is preferably two. A water content in the polyfunctional acid halide solution (first polyfunctional acid halide solution) applied firstly is preferably 10 to 500 ppm and more preferably 10 to 200 ppm. A water content in the polyfunctional acid halide solution (second polyfunctional acid halide solution) applied secondly is preferably 1 to 300 ppm and more preferably 1 to 150 ppm.

A temperature of the membrane surface immediately after the polyfunctional amine aqueous solution is brought into contact with the polyfunctional acid halide solution is preferably in a range of 25 to 60° C. and more preferably in a range of 30 to 50° C. By setting the temperature of the membrane surface to 25° C. or more, the fold structure significantly grows, and a permeation flux increases. In addition, by setting the temperature of the membrane surface to 60° C. or less, a composite semipermeable membrane exhibiting favorable salt removal performance can be obtained.

As a method for imparting the temperature to the membrane surface, the support membrane may be heated, or a heated organic solvent solution of the polyfunctional acid halide may be brought into contact. The temperature of the membrane surface immediately after the polyfunctional amine aqueous solution is brought into contact with the polyfunctional acid halide solution can be measured with a non-contact thermometer such as a radiation thermometer.

As described above, after the separation functional layer containing the crosslinked polyamide is formed on the porous support layer by bringing the organic solvent solution of the polyfunctional acid halide into contact with the polyfunctional amine aqueous solution to perform interfacial polycondensation, the excessive solvent may be removed. As a method for liquid removal, for example, it is possible to use a method of holding the membrane in a vertical direction and removing the excessive organic solvent by naturally flowing down. In this case, a time of holding in the vertical direction is preferably 1 to 5 minutes and more preferably 1 to 3 minutes. When the time is 1 minute or more, a sufficient amount of the polyamide can be formed as the separation functional layer, and when the time is 5 minutes or less, the organic solvent is not excessively evaporated, and thus occurrence of defects of the membrane can be inhibited.

(2-2) Formation of Support Membrane

As the support membrane, a commercially available filter can be applied. In addition, the support membrane containing the base material and the porous support layer may be formed by applying a polymer solution onto the base material and then coagulating the polymer, or the support membrane may be formed by applying the polymer solution onto a substrate such as glass, then coagulating the polymer solution, and peeling the polymer from the substrate.

For example, in the case of forming the support membrane using a polysulfone, the polysulfone is dissolved in N,N-dimethylformamide (hereinafter, referred to as DMF) to obtain a polymer solution, and the solution is applied onto the base material to a predetermined thickness, followed by wet-coagulation in water. According to this method, the porous support layer can be obtained in which most of the surface thereof has fine pores each having a diameter of several 10 nm or less.

(2-3) Other Treatment

Salt removal performance and water permeability of the composite semipermeable membrane after the formation of the separation functional layer can be improved by adding a process of performing a hot water treatment at preferably 50 to 150° C., more preferably 70 to 130° C. for preferably 1 second to 10 minutes and more preferably 1 minute to 8 minutes.

The salt removal rate of the composite semipermeable membrane can be further improved by including a process of bringing into contact with a compound (A) reactive with the primary amino group in the separation functional layer to form a diazonium salt or a derivative thereof after the hot water treatment and then bringing into contact with a water-soluble compound (B) reactive with the compound (A).

Examples of the compound (A) reactive with the primary amino group to form the diazonium salt or the derivative thereof include aqueous solutions of nitrous acid, salts thereof, and nitrosyl compounds. Since an aqueous solution of nitrous acid or a nitrosyl compound generates a gas and is easily decomposed, for example, it is preferable to sequentially produce nitrous acid by a reaction between a nitrite and an acidic solution. In general, a nitrite reacts with hydrogen ions to generate nitrous acid ($HNO_2$), and generation can efficiently proceed when pH of an aqueous solution is preferably 7 or less, more preferably 5 or less, and still more preferably 4 or less. Among them, an aqueous solution of sodium nitrite obtained by a reaction with hydrochloric acid or sulfuric acid in an aqueous solution is particularly preferable in view of ease of handling.

For example, when sodium nitrite is used as the compound (A) reactive with the primary amino group to form the diazonium salt or the derivative thereof, a concentration of sodium nitrite is preferably in a range of 0.01 to 1 weight %. When the concentration of sodium nitrite is within the above range, an effect of sufficiently generating the diazonium salt or the derivative thereof is obtained, and the solution is easily handled.

A temperature of the compound is preferably 15° C. to 45° C. When the temperature of the compound is in the above range, the reaction is not excessively time-consuming, decomposition of nitrous acid is not excessively fast, and thus handling is easy.

A time of contact between the primary amino group and the compound is a time during which the diazonium salt and/or the derivative thereof is generated, the treatment can be performed in a short time when the concentration is high, and a long time is required when the concentration is low. Therefore, according to the solution having the above concentration, the time is preferably within 10 minutes and more preferably within 3 minutes.

A method for bringing the primary amino group into contact with the compound is not particularly limited, a solution of the compound may be applied (coated), or the composite semipermeable membrane may be immersed in the solution of the compound. Any solvent may be used as a solvent for dissolving the compound as long as the compound is dissolved and the composite semipermeable membrane is not eroded. In addition, the solution of the compound may contain a surfactant, an acidic compound, an alkaline compound, or the like as long as the reaction between the primary amino group and the reagent is not hindered.

Next, the composite semipermeable membrane in which the diazonium salt or the derivative thereof is formed is brought into contact with the water-soluble compound (B) reactive with the diazonium salt or the derivative thereof. Here, examples of the water-soluble compound (B) reactive with the diazonium salt or the derivative thereof include chloride ions, bromide ions, cyanide ions, iodide ions, boron fluoride, hypophosphorous acid, sodium hydrogen sulfite, sulfite ions, aromatic amines, phenols, hydrogen sulfide, and thiocyanic acid.

When reacted with sodium hydrogen sulfite and sulfite ions, a substitution reaction occurs instantaneously, and an amino group is substituted with a sulfo group. In addition, contact with aromatic amines or phenols may cause a diazo coupling reaction and introduce an aromatic to the membrane surface.

These compounds may be used alone, or a plurality thereof may be used in combination, or the membrane may be brought into contact with different compounds a plurality of times. The compound to be brought into contact with the composite semipermeable membrane in which the diazonium salt or the derivative thereof is formed is preferably sodium hydrogen sulfite and sulfite ions.

A concentration at which and a time during which the composite semipermeable membrane in which the diazonium salt or the derivative thereof is formed is in contact with the water-soluble compound (B) reactive with the diazonium salt or the derivative thereof can be appropriately adjusted to obtain a desired effect.

The temperature at which the composite semipermeable membrane in which the diazonium salt or the derivative thereof is formed is brought into contact with the water-soluble compound (B) reactive with the diazonium salt or the derivative thereof is preferably 10° C. to 90° C. When the contact temperature is within the above temperature range, the reaction easily proceeds whereas a decrease in the amount of permeated water caused by shrinkage of the polymer does not occur.

The membranes before and after the treatment in (2-3) are each referred to as the "composite semipermeable membrane", and the layers on the support membranes of the membranes before and after the treatment in (2-3) are each referred to as the "separation functional layer".

(3) Use of Composite Separation Membrane

The composite semipermeable membrane according to the present embodiment produced in this way is suitably used as a spiral-type composite semipermeable membrane element obtained by winding, around a cylindrical water collection tube provided with a large number of holes, the composite semipermeable membrane together with a raw water channel material such as a plastic net, a permeated water channel material such as tricot, and a film for increasing pressure resistance if necessary. Further, the composite semipermeable membrane can also be used in a composite semipermeable membrane module in which such elements are connected in series or parallel and accommodated in a pressure vessel.

The composite semipermeable membrane, the element thereof, and the module thereof, in combination with a pump for supplying raw water thereto, a device for pretreating the raw water, and the like, can implement a fluid separation device. By using this separation device, raw water can be separated into permeated water such as drinking water and concentrated water that does not permeate through the composite semipermeable membrane to obtain intended water.

As operating pressure of the fluid separation device increases, the salt removal rate increases but energy required for operation also increases. In addition, in consideration of durability of the composite semipermeable membrane, the operating pressure when water to be treated permeates the composite semipermeable membrane is preferably 0.5 MPa or more and 10 MPa or less. A temperature of supplied water is preferably 5° C. or higher and 45° C. or lower since the salt removal rate of the composite semipermeable membrane decreases as the temperature increases and a membrane permeation flux decreases as the temperature decreases. In addition, when pH of the supplied water is high, in a case where the supplied water has a high salt concentration, such as seawater, there is a concern that scale of magnesium or the like is generated, and there is also a concern that the composite semipermeable membrane deteriorates due to operation with high pH. Therefore, operation in a neutral range is preferable.

Examples of the raw water to be treated by the composite semipermeable membrane according to the present embodiment include liquid mixtures containing salt (total dissolved solids) of 50 mg/L to 100 g/L, such as seawater, brackish water, or wastewater. In general, the salt refers to an amount of total dissolved solids and is represented by "mass ÷volume" or a "weight ratio". According to the definition, the total dissolved solids can be calculated from a weight of residue obtained by evaporating, at a temperature of 39.5 to 40.5° C., a solution filtered through a filter of 0.45 μm and is more conveniently converted from practical salinity (S).

Examples

Hereinafter, the present invention will be described in more detail with reference to Examples, but the present invention is not limited to these Examples.

Measurements of Examples and Comparative Examples were Performed as Follows

Reference Example 1

An 18 weight % DMF solution of a polysulfone was cast at a room temperature (25° C.) to a thickness of 200 μm on a polyester nonwoven fabric formed of long fibers, followed by immediate immersion in pure water and standing for 5 minutes to prepare a support membrane.

Example 1

The support membrane obtained in Reference Example 1 was immersed in an aqueous solution containing 4 weight % of m-phenylenediamine (m-PDA) for 2 minutes. The support membrane was slowly pulled up in a vertical direction and nitrogen was blown from an air nozzle to remove the excessive aqueous solution from a surface of the support membrane. Next, as a first polyfunctional acid halide solution, an η-decane solution (water content: 20 ppm) containing 0.12 weight % of trimesic acid chloride (TMC) and 6 ppm of dioctyl phthalate as an additive was applied such that the surface of the support membrane was completely wet.

Next, the support membrane was heated in an oven at 100° C., and thereafter, in order to remove the excessive solution from the support membrane, the support membrane was set vertically to remove liquid, and dried by blowing air at 20° C. using a blower.

Finally, the support membrane was washed with pure water at 90° C. to obtain a composite semipermeable membrane. Tables 1 and 2 show an actual length of a thin membrane on a surface of a separation functional layer, a thickness of the thin membrane on a protrusion, a height of the protrusion (existence ratio), a ratio of protrusion angle θ satisfying 0<θ<75°, a water content in the polyfunctional acid halide solution, and membrane performance of the obtained composite semipermeable membrane.

Examples 2 to 17

Composite semipermeable membranes were obtained in the same manner as the method in Example 1 except that additive types, additive concentrations, and a water content in the first polyfunctional acid halide solution were changed as shown in Table 1.

Examples 18 to 21

Composite semipermeable membranes were obtained in the same manner as the method in Example 1 except that the first polyfunctional acid halide solution having the additive concentrations and the water content shown in Table 1 was applied such that the surface of the support membrane was completely wet, and then, within 5 seconds, a second polyfunctional acid halide solution was further applied on a layer of the first polyfunctional acid halide solution such that the surface was completely wet. The second polyfunctional acid halide solution was an η-decane solution containing 0.12 weight % of trimesic acid chloride (TMC), and a water content and types and concentrations of additives were as shown in Table 1.

Comparative Examples 1 to 3

Composite semipermeable membranes were obtained in the same manner as the method in Example 1 except that no additive was contained in the first polyfunctional acid halide solution and water contents were changed to values shown in Table 1.

Comparative Example 4

A composite semipermeable membrane was obtained in the same manner as the method in Example 1, except that an additive contained in the first polyfunctional acid halide solution was an aliphatic ester, and an additive concentration and a water content were changed to values shown in Table 1.

(Parameter Measurement of Thin Membrane in Separation Functional Layer)

A composite semipermeable membrane was embedded in polyvinyl alcohol (PVA) and stained with $OsO_4$, followed by cutting with an ultramicrotome to prepare an ultrathin section. A cross-sectional image of the obtained ultrathin section was captured using a transmission electron microscope. The cross-sectional image taken by the transmission electron microscope was taken into image analysis software Image J. The actual length of the thin membrane, the thin membrane thickness of the protrusion, the protrusion height, and the protrusion angle were measured by the above-described methods.

(Maximum Width (Wa) of Protrusion and Root Width (Wb) of Protrusion in Separation Functional Layer)

These parameters were measured by the above-described methods, and a ratio (Wa/Wb) of a maximum width (Wa) of the protrusion to a root width (Wb) of the protrusion was obtained. Coating of a sample of the composite semipermeable membrane sample was ruthenium tetroxide, and an S-900 electron microscope manufactured by Hitachi, Ltd. was used as an ultra-high-resolution field-emission scanning electron microscope.

(Water Content in Polyfunctional Acid Halide Solution)

The water content in the polyfunctional acid halide solution was measured five times using a trace moisture measuring device CA-05 manufactured by Mitsubishi Chemical Corporation, and an average value was obtained.

(Evaluation of Performance under High Temperature and High Pressure)

Evaluation raw water (having a NaCl concentration of 3.2% and a boron concentration of about 5 ppm) adjusted to have a temperature of 40° C. and pH of 6.5 was supplied to the composite semipermeable membrane at operation pressure of 7.0 MPa to perform a membrane filtration treatment for 100 hours. Thereafter, performance of the composite semipermeable membrane was evaluated using the following method.

(Membrane Performance Evaluation)
(NaCl Transmittance)

The evaluation raw water (having a NaCl concentration of 3.2% and a boron concentration of about 5 ppm) adjusted to have a temperature of 25° C. and pH of 6.5 was supplied to the composite semipermeable membrane under operating pressure of 5.5 MPa to perform a membrane filtration treatment for 24 hours. Thereafter, electrical conductivity of each of supplied water and permeated water was measured with an electrical conductometer manufactured by Toa Electric Industrial Co. Ltd. to obtain a NaCl concentration, respectively.

NaCl Transmittance (%)=100×(NaCl Concentration in Permeated Water/NaCl Concentration in Supplied Water)

(Membrane Permeation Flux)

In the tests described above, an amount of the supplied water (evaluation raw water) permeated through the membrane was represented by an amount (cubic meter) of permeated water per day per square meter of a membrane surface as a membrane permeation flux ($m^3/m^2$/day).

TABLE 1

| | | Polyfunctional Acid Halogen Solution | | |
|---|---|---|---|---|
| | Additive/ Concentration | Water Content in First Polyfunctional Acid Halide Solution | Water Content in Second Polyfunctional Acid Halide Solution | |
| | | [ppm] | [ppm] | [ppm] |
| Example 1 | Dioctyl Phthalate | 5 | 6 | — |
| Example 2 | Dioctyl Phthalate | 5 | 21 | — |
| Example 3 | Bis(2-ethylhexyl) Phthalate | 5 | 5 | — |
| Example 4 | Dioctyl Phthalate | 20 | 22 | — |
| Example 5 | Dioctyl Phthalate | 40 | 21 | — |
| Example 6 | Dioctyl Phthalate | 80 | 23 | — |
| Example 7 | Dioctyl Phthalate | 100 | 20 | — |
| Example 8 | Dioctyl Phthalate | 150 | 20 | — |
| Example 9 | Dioctyl Phthalate | 400 | 21 | — |
| Example 10 | Dioctyl Phthalate | 500 | 20 | — |
| Example 11 | Dioctyl Phthalate | 5 | 111 | — |
| Example 12 | Dioctyl Phthalate | 20 | 113 | — |
| Example 13 | Dioctyl Phthalate | 150 | 110 | — |
| Example 14 | Dioctyl Phthalate | 20 | 141 | — |
| Example 15 | Dioctyl Phthalate | 400 | 110 | — |
| Example 16 | Dioctyl Phthalate | 500 | 111 | — |
| Example 17 | Dioctyl Phthalate | 500 | 143 | — |
| Example 18 | Dioctyl Phthalate | 5 | 101 | <5 |
| Example 19 | Dioctyl Phthalate | 20 | 119 | <5 |
| Example 20 | Dioctyl Phthalate | 380 | 103 | <5 |
| Example 21 | Dioctyl Phthalate | 20 | 23 | 10 |
| Comparative Example 1 | — | 0 | 3 | — |
| Comparative Example 2 | — | 0 | 111 | — |
| Comparative Example 3 | — | 0 | 140 | — |
| Comparative Example 4 | Ethyl Caprylate | 500 | 4 | — |

TABLE 2

| | Actual Length of Thin Membrane [μm] | Thickness of Thin Membrane [nm] | Height of Protrusion (Existence Ratio) | | | Ratio of Protrusion Angle θ 0 < θ < 75° [%] | Wa/Wb Wa: Maximum Width of Protrusion Wb: Root Width of Protrusion | Performance after High-Pressure Operation | |
|---|---|---|---|---|---|---|---|---|---|
| | | | 10 nm or more and less than 200 nm [%] | 200 nm or more and less than 400 nm [%] | 400 nm or more [%] | | | NaCl Transmittance [%] | Membrane Permeation Flux [$m^3m^2$/day] |
| Ex. 1 | 3.0 | 22 | 100 | 0 | 0 | 0 | 1.2 | 0.25 | 0.75 |
| Ex. 2 | 3.1 | 17 | 100 | 0 | 0 | 0 | 1.2 | 0.21 | 0.82 |
| Ex. 3 | 3.0 | 20 | 100 | 0 | 0 | 0 | 1.2 | 0.28 | 0.73 |
| Ex. 4 | 3.9 | 18 | 100 | 0 | 0 | 0 | 1.1 | 0.20 | 0.96 |
| Ex. 5 | 4.1 | 15 | 100 | 0 | 0 | 0 | 1.2 | 0.28 | 0.99 |
| Ex. 6 | 3.0 | 15 | 100 | 0 | 0 | 0 | 1.2 | 0.31 | 1.0 |
| Ex. 7 | 3.3 | 15 | 95 | 5 | 0 | 0 | 1.1 | 0.25 | 1.0 |
| Ex. 8 | 3.8 | 15 | 80 | 19 | 0 | 0 | 1.2 | 0.31 | 1.1 |
| Ex. 9 | 3.3 | 16 | 91 | 4 | 5 | 0 | 1.2 | 0.35 | 1.2 |
| Ex. 10 | 4.6 | 15 | 62 | 20 | 18 | 0 | 1.2 | 0.39 | 1.3 |
| Ex. 11 | 3.0 | 16 | 94 | 6 | 0 | 5 | 1.1 | 0.29 | 1.1 |
| Ex. 12 | 3.6 | 17 | 80 | 20 | 0 | 20 | 1.2 | 0.21 | 1.3 |
| Ex. 13 | 4.2 | 15 | 80 | 20 | 0 | 50 | 1.2 | 0.27 | 1.3 |
| Ex. 14 | 4.4 | 15 | 80 | 20 | 0 | 40 | 1.2 | 0.38 | 1.3 |
| Ex. 15 | 4.4 | 18 | 90 | 5 | 5 | 20 | 1.2 | 0.29 | 1.4 |
| Ex. 16 | 4.3 | 15 | 75 | 20 | 5 | 50 | 1.2 | 0.33 | 1.5 |
| Ex. 17 | 4.8 | 15 | 60 | 20 | 20 | 60 | 1.2 | 0.39 | 1.6 |
| Ex. 18 | 3.3 | 17 | 90 | 10 | 0 | 7 | 1.5 | 0.29 | 1.4 |
| Ex. 19 | 3.8 | 18 | 78 | 22 | 0 | 25 | 1.7 | 0.20 | 1.5 |
| Ex. 20 | 4.6 | 18 | 84 | 12 | 4 | 22 | 1.7 | 0.28 | 1.6 |
| Ex. 21 | 4.2 | 18 | 100 | 0 | 0 | 0 | 1.6 | 0.21 | 1.1 |
| Comp Ex. 1 | 1.9 | 20 | 100 | 0 | 0 | 0 | 1 | 0.55 | 0.57 |

TABLE 2-continued

| | Actual Length of Thin Membrane [μm] | Thickness of Thin Membrane [nm] | Height of Protrusion (Existence Ratio) | | | Ratio of Protrusion Angle θ $0 < θ < 75°$ [%] | Wa/Wb Wa: Maximum Width of Protrusion Wb: Root Width of Protrusion | Performance after High-Pressure Operation | |
|---|---|---|---|---|---|---|---|---|---|
| | | | 10 nm or more and less than 200 nm [%] | 200 nm or more and less than 400 nm [%] | 400 nm or more [%] | | | NaCl Transmittance [%] | Membrane Permeation Flux [m³m²/day] |
| Comp. Ex. 2 | 2.1 | 19 | 100 | 0 | 0 | 0 | 1.2 | 0.68 | 0.72 |
| Comp. Ex. 3 | 3.8 | 10 | 100 | 0 | 0 | 0 | 1.2 | 0.79 | 0.75 |
| Comp. Ex. 4 | 2.7 | 11 | 100 | 0 | 0 | 0 | 1.1 | 0.98 | 0.87 |

As shown in Table 2, the composite semipermeable membranes in Examples 1 to 21 exhibited excellent salt removal performance and permeability even after high-pressure operation as compared with those in Comparative Examples 1 to 4.

Although the present invention has been described in detail with reference to specific embodiments, it is apparent to those skilled in the art that various changes and modifications can be made without departing from the spirit and scope of the present invention. The present application is based on the Japanese patent application (Japanese Patent Application No. 2021-072383) filed on Apr. 22, 2021, and the contents thereof are incorporated herein by reference.

INDUSTRIAL APPLICABILITY

The composite semipermeable membrane according to the present invention can be particularly suitably used for desalination of seawater and brackish water.

What is claimed is:

1. A composite semipermeable membrane comprising:
a support membrane; and
a separation functional layer provided on the support membrane, wherein
the separation functional layer comprises a thin membrane,
the thin membrane has a fold structure comprising a plurality of protrusions,
an actual length L of the thin membrane per 1 μm length of the support membrane in a cross-sectional direction perpendicular to a membrane surface is 3.0 μm or more and 100 μm or les,
a thickness of the thin membrane in the protrusion is 15 nm or more and 30 nm or less,
the fold structure comprises a protrusion having a height of 200 nm or more and a protrusion having a height of 10 nm or more and less than 200 nm, and
a ratio (N/M) is 1/20 or more and 1/2 or less, wherein N is the number of the protrusions having the height of 200 nm or more and M is the number of the protrusions having the height of 10 nm or more.

2. The composite semipermeable membrane according to claim 1, wherein
in the fold structure, a ratio of the number of the protrusions having a height of 400 nm or more to the number of the protrusions having the height of 10 nm or more is 1/20 or more and 1/5 or less.

3. The composite semipermeable membrane according to claim 2, wherein
at least a part of the plurality of protrusions has a ratio (Wa/Wb) of larger than 1.3 and 1.8 or less in cross sections at arbitrary ten positions each having a length of 2.0 μm in a membrane surface direction of the support membrane, provided that Wa is a maximum width of the protrusion and Wb is a root width of the protrusion.

4. The composite semipermeable membrane according to claim 1, wherein
among the protrusions, a ratio of protrusions having an angle θ satisfying $0<θ<75°$ is 5% or more and 80% or less, provided that the angle θ is an angle between a straight line (C) and an average line (A) of a roughness curve of the fold structure, the straight line (C) is a straight line passing through a point (a3) at an equal distance from two intersections (a1, a2) of the average line (A) and the thin membrane and a vertex of the protrusion.

5. The composite semipermeable membrane according to claim 4, wherein
at least a part of the plurality of protrusions has a ratio (Wa/Wb) of larger than 1.3 and 1.8 or less in cross sections at arbitrary ten positions each having a length of 2.0 μm in a membrane surface direction of the support membrane, provided that Wa is a maximum width of the protrusion and Wb is a root width of the protrusion.

6. The composite semipermeable membrane according to claim 1, wherein
at least a part of the plurality of protrusions has a ratio (Wa/Wb) of larger than 1.3 and 1.8 or less in cross sections at arbitrary ten positions each having a length of 2.0 μm in a membrane surface direction of the support membrane, provided that Wa is a maximum width of the protrusion and Wb is a root width of the protrusion.

* * * * *